G. BASLER.
ROUGH ROUNDER.
APPLICATION FILED FEB. 3, 1913.
1,121,578.
Patented Dec. 15, 1914.
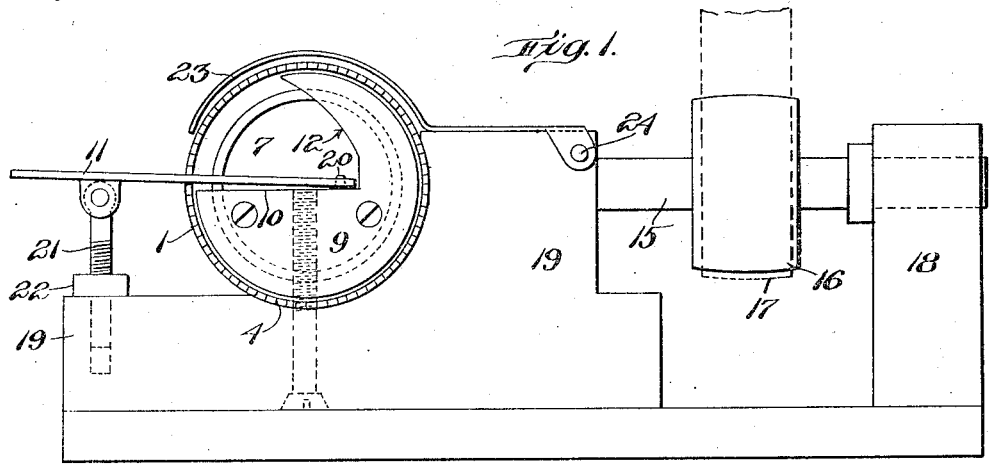
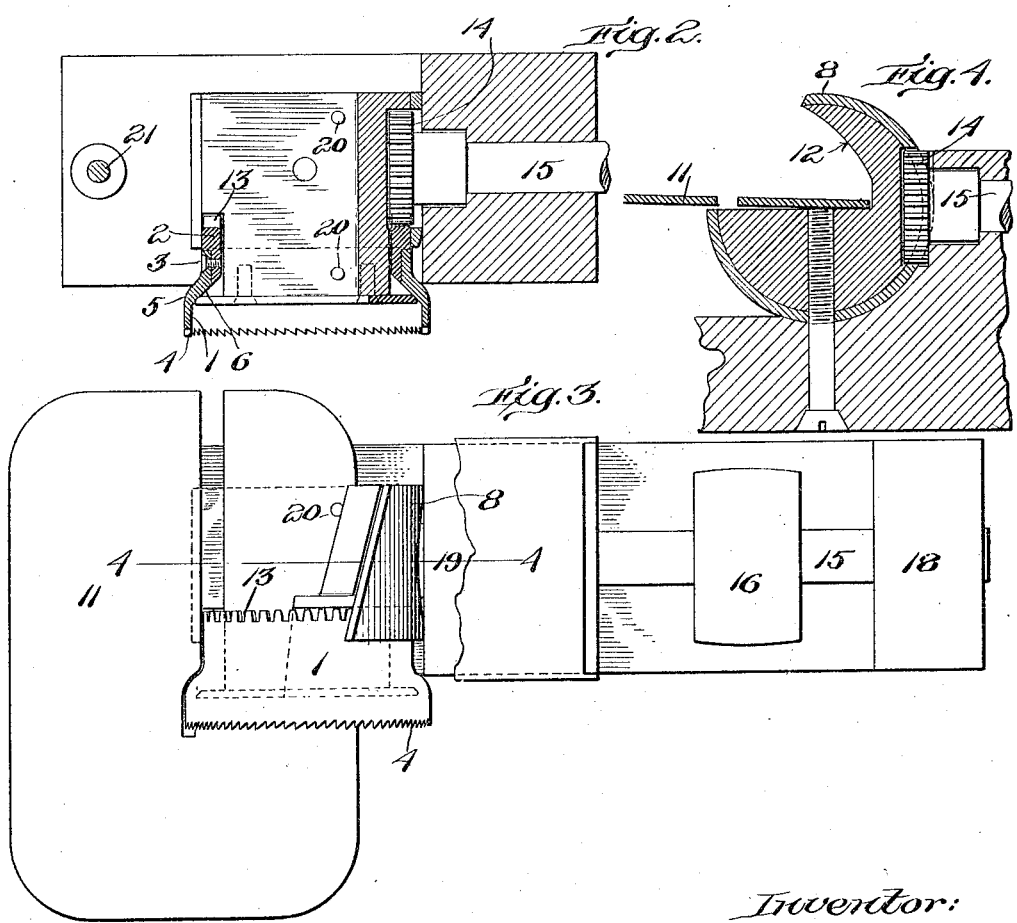
Witnesses:
Edward Maxwell
Amos J. Webster
Inventor:
George Basler,
by Geo. H. Maxwell
Atty.

UNITED STATES PATENT OFFICE.

GEORGE BASLER, OF LYNN, MASSACHUSETTS, ASSIGNOR TO BASLER MACHINERY COMPANY, OF LYNN, MASSACHUSETTS, A CORPORATION OF MAINE.

ROUGH-ROUNDER.

1,121,578. Specification of Letters Patent. Patented Dec. 15, 1914.

Application filed February 3, 1913. Serial No. 745,873.

*To all whom it may concern:*

Be it known that I, GEORGE BASLER, a citizen of the United States, and resident of Lynn, county of Essex, State of Massachusetts, have invented an Improvement in Rough-Rounders, of which the following description, in connection with the accompanying drawings, is a specification, like letters on the drawings representing like parts.

In the manufacture of shoes one of the exceedingly difficult steps in the manufacture is to get a smooth and properly evened and shaped edge to the sole, especially adjacent the hollow of the foot or inside of the shank.

My present invention aims to take the place of the so-called rough rounder, and provides means for securing the above described edge at all points around the sole, including the shank portion, and aims to provide means for accomplishing this object with great rapidity, accuracy and high quality of finish. To this end I provide a high speed cutting tool, so shaped that it will curve away from the shoe in the direction required to permit the vamp to overhang the sole at the hollow of the foot mentioned, and will also permit the sole to be turned abruptly as required, just back of the ball when rounding the sole adjacent said hollow, said cutting tool proceeding somewhat on the principle of a combined saw and planing or grinding or polishing tool, and in its preferred embodiment consisting of a rotary ring or hollow band-like cutter provided on its front edge with relatively fine raking teeth so located and shaped with reference to the work as to remove the surplus leather with great rapidity and yet leave a smooth and preferably more or less finished and polished sole-edge, while permitting the shoe to be moved in the various positions required for giving the desired shape to the sole-edge in all its curvatures and angles.

In the accompanying drawings, in which I have shown one embodiment of my invention, Figure 1 is a front view thereof; Fig. 2 is a central horizontal sectional view, taken approximately in the plane of the work table; Fig. 3 is a plan view; and Fig. 4 is a section, taken on line 4—4, of Fig. 2.

The annular or ring-like edge-dressing tool which constitutes the main feature of my invention is herein shown as comprising two parts, a cutting part 1 and a driving part 2 preferably removably secured together by any suitable means, as by screws 3, so as to constitute a band-like tool of small radius. The part 1 has teeth 4 formed in its front edge and preferably lying in the plane of said edge, somewhat like the teeth of a saw (excepting that they have no "set"). This tool is provided with a relatively sharp external bend 5 just back from said edge, and a reverse bend 6 on its inner side, said bend 5 being provided to enable the shoe to be shifted laterally when the edge 4 is required to cut a concave portion of the sole-edge, and said part 6 being provided to permit the cutaway portion of the sole to escape preferably through the opening 7 which extends entirely through the tool. The tool is provided with fixed external and internal bearings 8, 9, the latter being cut away at 10 to receive a work table 11, and at 12 to overhang the space 7. The inner edge of the driving part 2 of the tool is provided with gear teeth 13 to mesh with a driving pinion 14 fast on the end of a shaft 15, driven by any suitable means, as by a belt pulley 16 and belt 17, said shaft being journaled in supports 18, 19 and the latter serving also to support the bearings 8 and 9 and the table 11. The table 11 is made angularly adjustable by any suitable means, being herein shown as having a hingelike support at 20 adjacent its right hand or inner edge, and provided at its outer edge with adjusting means shown as a pivoted and threaded leg 21 engaged by a nut 22 seated in the support 19. One reason that the tool 1 has a small radius is to enable it to engage the sole properly underneath the overhanging vamp at the hollow of the foot, and accordingly to keep the leather of the vamp out of accidental contact with the edge 4 of said tool, I provide a guard 23 pivoted at 24 to the support 19, and extending thence forward over the annular tool or rounder sufficiently near to the normal position of the sole to make it impossible for the vamp to come in contact with the rapidly rotating cutting member.

In use, the operator places the shoe with the sole flat down on the table 11 and then presses the sole forward, following whatever mark or guide is provided by which to "round" the sole. This guide is usually the outer edge of the welt. As the sole moves forward, the relatively fine teeth 4 sever the leather along the desired line and the removed strip passes on through the open space 7 while the shoe itself overhangs the relatively small tool to whatever extent is required by the size and style of the shoe, and yet with no possibility of being injured. When the hollow of the shoe is reached, the shoe is radially deflected or shifted on the table 11 so as to permit the desired concavity of the sole edge to be formed, this shifting of the shoe and sole being freely permitted by the annular curve 5 and by the relatively narrow width of the band 1, 2. Moreover, as the shoe moves along, the flat outer sides of the cutting part 1 and its rapidly moving teeth prevent the formation of a rough or jagged surface, but on the contrary produce a smooth and often a polished surface or sole-edge. If, for any reason, it is desired to give the sole-edge a particular bevel, the table 11 is adjusted correspondingly to the right angle or level, by means of the adjusting nut 22. In designating my machine as a "rough rounder," it will be understood that I am conforming merely to the custom of calling the machine by that name which performs this office on a sole, but that the work of my machine is not rough. This has already been explained.

I wish it understood that my invention is not limited to the precise details herein set forth, excepting as specified in certain of the claims, inasmuch as the invention is capable, in its broader aspects, of a wide range of mechanical embodiments, as will appear from the broader of the appended claims.

Having described my invention, what I claim as new and desire to secure by Letters Patent is:

1. A rough rounder, comprising a leather edge-cutting tool with a bandlike cutting edge to trim surplus stock from a sole edge, said cutter having a cylindrical portion carrying the cutting edge and being curved away from the cutting edge immediately back of said cylindrical portion at a sufficiently shorter radius and at a relatively sharper angle than that of a shoe shank whose sole is to be operated upon to permit the sole to be presented to the cutting edge at varying angles, whereby the back of said cutter avoids interference with the overhanging shoe upper at the shank and permits said cutter to trim the sole edge both straight and on a bevel.

2. A rough rounder, comprising a leather edge-cutting tool with a bandlike cutting edge to trim surplus stock from a sole edge, said cutter having a cylindrical cutting edge portion and an ogee curve immediately back of the cylindrical cutting edge and forming a relatively sharp angle to permit a sole to be presented to the cutting edge for trimming said sole in lines of curve different than the curve of said cutter.

3. A rough rounder, comprising an annular band-like cutter having leather cutting teeth at one edge of the band, gear teeth in the opposite edge, and an open space therethrough, a work table to support the sole substantially at a tangent to the operating portion of the cutting teeth, and means to rotate said cutter at a high speed.

4. An annular cutting tool, comprising a cutting portion and a driving portion having gear teeth therein, both portions being secured together, said cutting portion having teeth in its front edge, and being thence contracted inwardly on a curve of relatively short radius immediately back of said teeth, whereby the driving portion will be on a shorter annular ring to permit the sole of the shoe at the overhanging upper portion to be trimmed without interfering with the driving part of said cutter, in combination with means for rotating said cutter at high speed.

5. An annular band-like cutter, having a free open space therethrough axially thereof, stationary circular internal and external bearings for the cutter, means for rapidly rotating the cutter, a work table extending approximately diametrically of said cutter for presenting a sole-edge in position to be rounded, and a partially surrounding and overhanging guard extending toward the table in position to maintain the shoe upper out of contact with the cutter while the sole of said shoe is being rounded.

In testimony whereof, I have signed by name to this specification, in the presence of two subscribing witnesses.

GEORGE BASLER.

Witnesses:
WALTER W. PYNE,
JOSEPH F. McGRATH.

Copies of this patent may be obtained for five cents each, by addressing the "Commissioner of Patents, Washington, D. C."